(12) United States Patent
Yoshida et al.

(10) Patent No.: US 9,935,339 B2
(45) Date of Patent: Apr. 3, 2018

(54) NONAQUEOUS ELECTROLYTE SECONDARY BATTERY

(75) Inventors: Satoshi Yoshida, Moriguchi (JP); Eiji Okutani, Moriguchi (JP); Hideyuki Inomata, Moriguchi (JP); Ryuji Ohshita, Moriguchi (JP)

(73) Assignee: SANYO ELECTRIC CO., LTD., Daito-shi (JP)

( * ) Notice: Subject to any disclaimer, the term of this patent is extended or adjusted under 35 U.S.C. 154(b) by 1086 days.

(21) Appl. No.: 13/993,965

(22) PCT Filed: Dec. 16, 2011

(86) PCT No.: PCT/JP2011/079161
§ 371 (c)(1),
(2), (4) Date: Jun. 13, 2013

(87) PCT Pub. No.: WO2012/090726
PCT Pub. Date: Jul. 5, 2012

(65) Prior Publication Data
US 2013/0260203 A1    Oct. 3, 2013

(30) Foreign Application Priority Data
Dec. 28, 2010 (JP) ................................. 2010-294253

(51) Int. Cl.
| | | |
|---|---|---|
| *H01M 10/0587* | (2010.01) | |
| *H01M 2/22* | (2006.01) | |
| *H01M 2/34* | (2006.01) | |
| *H01M 2/26* | (2006.01) | |

(52) U.S. Cl.
CPC ......... *H01M 10/0587* (2013.01); *H01M 2/22* (2013.01); *H01M 2/263* (2013.01); *H01M 2/34* (2013.01)

(58) Field of Classification Search
None
See application file for complete search history.

(56) References Cited

U.S. PATENT DOCUMENTS

| | | | | |
|---|---|---|---|---|
| 2003/0175587 A1* | 9/2003 | Okutani | .............. | H01M 2/0408 429/211 |
| 2003/0186095 A1* | 10/2003 | Okutani | ................ | H01M 2/263 29/623.1 |

(Continued)

FOREIGN PATENT DOCUMENTS

| | | |
|---|---|---|
| CN | 1445874 A | 10/2003 |
| CN | 1531133 A | 9/2004 |

(Continued)

OTHER PUBLICATIONS

International Search Report of PCT/JP2011/079161, dated Feb. 14, 2012.

(Continued)

*Primary Examiner* — Barbara L Gilliam
*Assistant Examiner* — Adam A Arciero
(74) *Attorney, Agent, or Firm* — Westerman, Hattori, Daniels & Adrian, LLP (57) ABSTRACT

[Problem] To provide a rectangular nonaqueous electrolyte secondary battery for which the generation of a magnetic field due to current during use is suppressed and the danger of internal shorts between the positive electrode tab and negative electrode tab is reduced. [Solution] The positive electrode tab and negative electrode tab are both disposed at the beginning side of a winding for wound electrodes. An outer housing and sealing plate are welded in a state with the positive electrode tab sandwiched at a mating part of the outer housing and sealing plate. The negative electrode tab is electrically connected to a negative electrode terminal provided on the sealing plate. The positive electrode tab and negative electrode tab are divided by a space of 2-12 mm in the direction of battery width.

6 Claims, 9 Drawing Sheets

(56) References Cited

U.S. PATENT DOCUMENTS

| | | | |
|---|---|---|---|
| 2004/0009391 A1* | 1/2004 | Lee | H01M 2/021 |
| | | | 429/94 |
| 2004/0161662 A1 | 8/2004 | Kim et al. | |
| 2006/0003221 A1 | 1/2006 | Yeo | |
| 2006/0147793 A1 | 7/2006 | Kim et al. | |
| 2006/0222934 A1* | 10/2006 | Min | H01M 2/1673 |
| | | | 429/142 |
| 2006/0222937 A1* | 10/2006 | Morimoto | H01M 2/0207 |
| | | | 429/164 |
| 2011/0052971 A1 | 3/2011 | Fujikawa et al. | |
| 2012/0177963 A1 | 7/2012 | Lee et al. | |

FOREIGN PATENT DOCUMENTS

| | | |
|---|---|---|
| CN | 1713418 A | 12/2005 |
| CN | 101983446 A | 3/2011 |
| EP | 1347521 A1 | 9/2003 |
| JP | 10-162792 A | 6/1998 |
| JP | 2000-285897 A | 10/2000 |
| JP | 2003-086166 A | 3/2003 |
| JP | 2003-272597 A | 9/2003 |
| JP | 2004-253381 A | 9/2004 |
| JP | 2005-209530 A | 8/2005 |
| JP | 2006-012808 A | 1/2006 |
| JP | 2010140862 A | 6/2010 |
| KR | 10-0509606 B1 | 8/2005 |
| KR | 10-2010-0114515 A | 10/2010 |
| WO | 2010070805 A1 | 6/2010 |
| WO | 2012/026705 A1 | 3/2012 |

OTHER PUBLICATIONS

Office Action dated Dec. 1, 2015, issued in counterpart Japanese Patent Application No. 2012-550826. (4 pages).

* cited by examiner 10A, 10B, 10D

NONAQUEOUS ELECTROLYTE SECONDARY BATTERY

TECHNICAL FIELD

The present invention relates to a nonaqueous electrolyte secondary battery, and in particular relates to a nonaqueous electrolyte secondary battery that generates a small magnetic field resulting from a flow of an electrical current during use and that reduces noise effects due to the magnetic field exerted on hearing aids and the like.

BACKGROUND ART

Nonaqueous electrolyte secondary batteries represented by lithium secondary batteries with a high energy density and high capacity are widely used as a power supply to drive modern portable electronic devices such as cellular phones, portable personal computers, and portable music players and further used as a power supply for hybrid electric vehicles (HEV) and electric vehicles (EV). In the nonaqueous electrolyte secondary batteries used particularly for small devices, a prismatic type is widely used because of its advantages in space efficiency and easy handling.

These nonaqueous electrolyte secondary batteries generally include a positive electrode plate in which a positive electrode substrate is made of aluminum foil or the like in elongated sheet, and both surfaces of the positive electrode substrate are coated with a positive electrode mixture that includes a positive electrode active material absorbing and desorbing lithium ions; and include a negative electrode plate in which a negative electrode substrate is made of copper foil or the like in elongated sheet, and both surfaces of the negative electrode substrate are coated with a negative electrode mixture that includes a negative electrode active material absorbing and desorbing lithium ions. The positive electrode plate and the negative electrode plate, which are made insulated from each other by interposing therebetween a separator made of microporous polyethylene film or the like, are wound in cylindrical or in oval to form a wound electrode assembly. In the case of a prismatic battery, the wound electrode assembly is thereafter pressed into a flattened shape.

Patent Document 1 discloses a prismatic nonaqueous electrolyte secondary battery including such a flattened wound electrode assembly. As an example of the prismatic nonaqueous electrolyte secondary battery in related art, the structure of a prismatic sealed battery 50 disclosed in Patent Document 1 will now be described with reference to FIG. 7.

Figure 7:
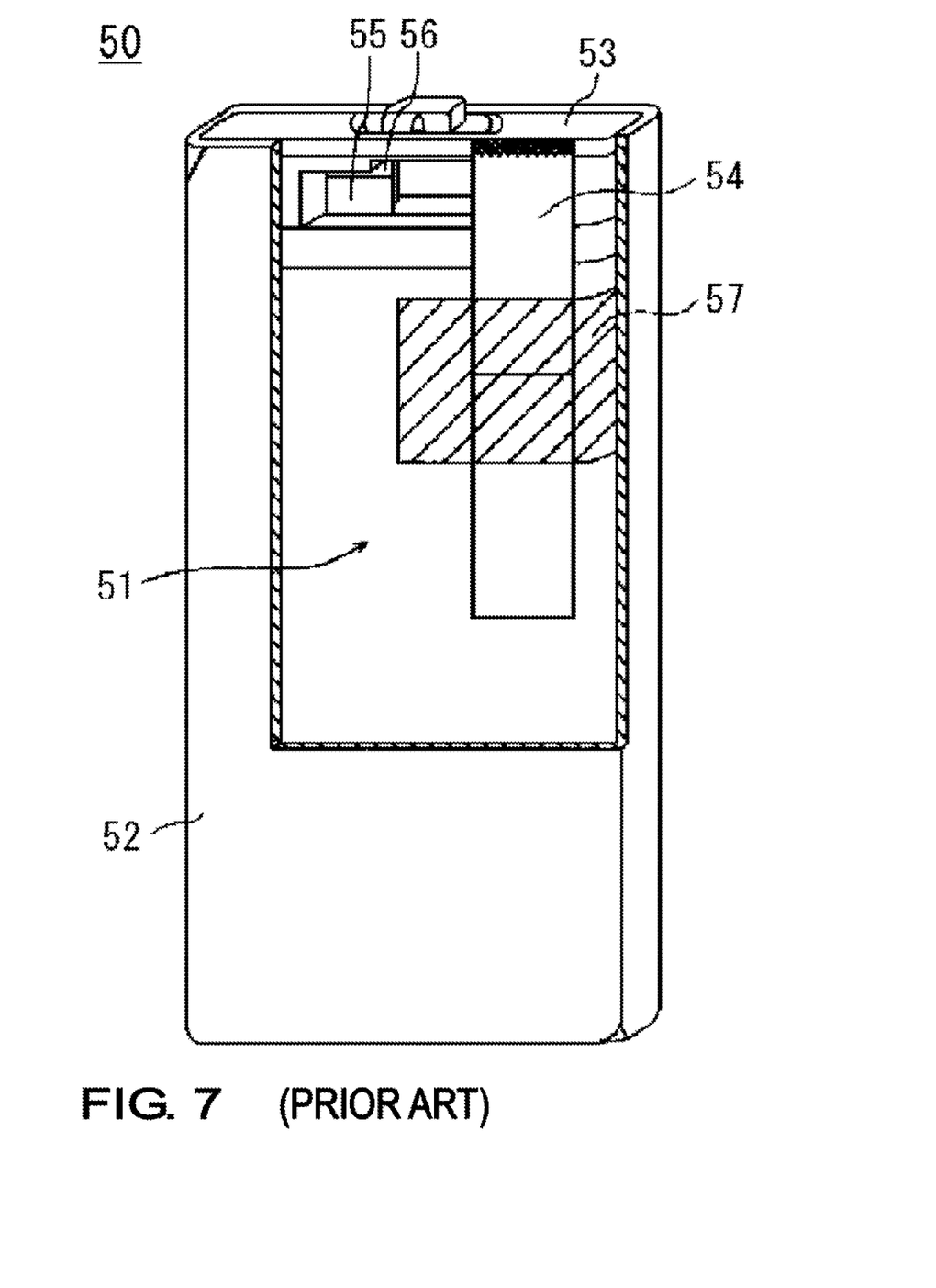
FIG. 7 is a perspective view of a main portion of a sealed battery in related art.

FIG. 7 is a perspective view of a main portion of the prismatic sealed battery 50 disclosed in Patent Document 1. The prismatic sealed battery 50 has a structure that a battery outer housing 52, made of aluminum, concurrently serving as a positive electrode external terminal accommodates therein a spiral electrode assembly 51 having a positive electrode plate and a negative electrode plate, which are wound together with a separator interposed therebetween.

The positive electrode plate has a positive electrode substrate exposed portion that has no positive electrode active material layers on either surface of the positive electrode substrate (hereinafter "both surfaces exposed portion") for a certain distance from the winding terminating end of the positive electrode substrate. Furthermore, another positive electrode substrate exposed portion, in which either surface of the positive electrode substrate has a positive electrode active material layer and the other surface has the substrate exposed (hereinafter the "either surface exposed portion"), is provided for a certain distance from the both surfaces exposed portion. The both surfaces exposed portion has a substantially U-shaped slit portion formed with three slit lines penetrating the substrate, and a positive electrode collector tab 54 is formed by cutting and raising up the slit portion.

The spiral electrode 51 is wound in a manner that the either surface exposed portion of the positive electrode plate faces to the outer periphery and the both surfaces exposed portion is arranged at the outermost periphery of the spiral electrode 51. Doing so makes the substrate exposed portion and the inner surface of the battery outer housing in contact with each other. By the contact of the substrate exposed portion and the inner surface of the battery outer housing, the battery outer housing 52 that concurrently serves as a positive electrode external terminal and the positive electrode are made electrically connected to each other.

The battery outer housing 52 is sealed by a sealing plate 53 welded along the edge of the upper mouth by laser welding. The outer periphery side surface of the sealing plate 53 and the inner surface of the mouth marginal portion of the battery outer housing 52 are welded by laser, holding therebetween the positive electrode collector tab 54 derived from the positive electrode plate.

In the negative electrode plate, a negative electrode collector tab 55 is electrically connected by spot welding to a negative electrode substrate exposed portion, which is formed at the winding starting end. Furthermore, the negative electrode collector tab 55 is electrically connected to a collector terminal plate 56 fixed to the sealing plate 53. An adhesive tape 57 is attached to the winding terminating end portion of the spiral electrode assembly 51 so as to protect the positive electrode collector tab 54 that is cut and raised up.

As above explained. with the sealed battery 50 disclosed in Patent Document 1, the positive electrode collector tab 54 is formed of a piece of foil that is made by cutting and raising up a part of the positive electrode substrate exposed portion. Thus, the properties of the positive electrode collector tab 54, such as mechanical strength, depend on the properties of the material used for the positive electrode substrate. However, because aluminum foil in the order of 10 and some micrometers is usually used for a positive electrode substrate, the sealed battery 50 disclosed in Patent Document 1 has a problem in that the positive electrode collector tab 54 has reduced mechanical strength.

As a solution of the above problem to improve the mechanical strength of the positive electrode collector tab, Patent Document 2 discloses an invention of a prismatic sealed battery that has a positive electrode tab made by electrically connecting a piece of foil with higher mechanical strength than the positive electrode substrate to the cut-raised up piece, instead of using the cut-raised up piece made by cutting and raising up the positive electrode substrate directly as a positive electrode collector tab.

RELATED ART DOCUMENT

Patent Document

Patent Document 1: JP-A-10-162792
Patent Document 2: JP-A-2003-272597
Patent Document 3: JP-A-2000-285897

DISCLOSURE OF INVENTION

Problem to be Solved by the Invention

Magnetic fields are generated by the electrical current that travels in a battery when using portable electronic devices.

Such magnetic fields may change to noise that has a negative effect, particularly for hearing aid users. Hearing aids have functions to catch outside sounds through a microphone and amplify them. They also have functions to catch magnetic flux generated from a speaker unit of a telephone by an electromagnetic coil with an electromagnetic pickup (sometimes called "telephone pickup") and to amplify the magnetic flux. Because of such functions, hearing aids are easily influenced, particularly by exterior magnetic field noise. Hearing aids use this kind of electromagnetic pickup because using a microphone of a hearing aid for catching and amplifying voices output through a telephone speaker reduces the clarity of the voices because the microphone also catches the surrounding noises.

Because a cellular phone in particular is used in a position close to a hearing aid, the magnetic field generated from the cellular phone easily exerts a negative effect on the hearing aid. Thus, a nonaqueous electrolyte secondary battery, which is a power supply of cellular phones, is also required to suppress the generation of a magnetic field that results from an electrical current traveling in the nonaqueous electrolyte secondary battery.

Batteries collect power by drawing an electrical current developed by chemical reactions that occur at each of the positive electrode plate and the negative electrode plate through a positive electrode tab and a negative electrode tab. Thus, it is generally conceived that batteries can reduce magnetic fields by making the directions of the electrical currents that travel through the positive electrode plate and the negative electrode plate opposite to each other in order for the magnetic fields generated by the respective electrical currents to balance each other out.

If the positive electrode tab and the negative electrode tab are both placed at either at the winding starting end or the winding terminating end of the corresponding electrode plate, and further if they are arranged in the overlapping position or in a position close to each other, the directions in which the respective electrical currents travel are in parallel and opposite to each other. Thus, it is theoretically possible to reduce magnetic fields resulting from the electrical currents that travel in the areas forming active materials of the positive electrode plate and the negative electrode plate. However, closer positions of the positive electrode tab and the negative electrode tab make the risk of an internal short circuit between them high. It is therefore difficult to put this into practice immediately because of problems in that any coping process may be required such as having a more complicated structure around the tab welded portion of a sealing plate, or in that the tabs may have difficulties in electrical insulation and in installation.

The inventor of the present invention has considered the possibility of solving such problems in related art from various view points, and completed the present invention, finding a method for reducing the generation of a magnetic field resulting from an electrical current that travels in a battery and reducing the risk of an internal short circuit in the battery. In this method, both the positive electrode tab and the negative electrode tab are arranged at the winding starting end of a wound electrode assembly and kept a predetermined distance apart from each other in the width direction of the battery, the positive electrode tab is welded to an outer housing and a sealing plate in a manner that the positive electrode tab is held between the mating portions of the outer housing and the sealing plate, and the negative electrode tab is electrically connected to a negative electrode terminal provided to the sealing plate.

Patent Document 3 discloses a sealed battery that includes a wound electrode assembly in which a positive electrode conductive tab coupled to a positive electrode plate and a negative electrode conductive tab coupled to a negative electrode plate are provided near the marginal portion of the winding starting end of the positive electrode plate and the negative electrode plate, respectively, with a certain distance from each other. Patent Document 3, however, has no considerations on the generation of a magnetic field resulting from an electrical current traveling in a battery, and also has no indications on suppressing a magnetic field by keeping the positive electrode tab and the negative electrode tab apart from each other by a predetermined distance in the width direction of the battery.

In view of the above-mentioned problems, the present invention provides a prismatic nonaqueous electrolyte secondary battery in which noise effects on hearing aids and the like are reduced by suppressing generation of magnetic fields resulting from an electrical current during use, and reliability is improved by reducing the risk of an internal short circuit between the positive electrode tab and the negative electrode tab.

Means for Solving the Problem

To achieve the object as above described, a nonaqueous electrolyte secondary battery according to the present invention includes: a flattened wound electrode assembly including a positive electrode plate that has a positive electrode active material layer and a positive electrode substrate exposed portion and including a negative electrode plate having a negative electrode active material layer and a negative electrode substrate exposed portion, in which the positive electrode plate and the negative electrode plate are wound with a separator interposed therebetween; a flattened metallic outer housing having a mouth portion at an end and accommodating the wound electrode assembly; a sealing plate mating with the mouth portion of the metallic outer housing; a positive electrode tab electrically connected to the positive electrode substrate exposed portion; and a negative electrode tab electrically connected to the negative electrode substrate exposed portion. In the nonaqueous electrolyte secondary battery, the positive electrode substrate exposed portion to which the positive electrode tab is electrically connected and the negative electrode substrate exposed portion to which the negative electrode tab is electrically connected are both arranged at the winding starting end of the wound electrode assembly, the positive electrode tab is welded to the outer housing and the sealing plate in a manner of being held between the mating portions of the outer housing and the sealing plate, the negative electrode tab is electrically connected to a negative electrode terminal provided to the sealing plate, and the positive electrode tab and the negative electrode tab are arranged apart from each other with a distance of 2 mm or more to 12 mm or less in the width direction of the battery.

In the nonaqueous electrolyte secondary battery of the present invention, the positions of the positive electrode tab and the negative electrode tab are both arranged at the winding starting end of the wound electrode assembly. An electrical current of the positive electrode plate and an electrical current of the negative electrode plate therefore travel in the opposite direction of each other, and the magnetic fields generated by the respective electrical currents balance each other out. Thereby, the magnetic fields leaking outside are suppressed.

In the nonaqueous electrolyte secondary battery of the present invention, the positive electrode tab is electrically connected to the positive electrode substrate exposed portion and is welded to the outer housing and the sealing plate in a manner of being held between the mating portions of the outer housing and the sealing plate. The negative electrode tab is electrically connected to a negative electrode terminal provided to the sealing plate, and the positive electrode tab and the negative electrode tab are arranged apart from each other with a distance of 2 mm or more to 12 mm or less in the width direction of the battery. Thereby, an advantageous effect is exerted in suppressing the magnetic fields as above described and also in reducing the risk of an internal short circuit between the positive electrode tab and the negative electrode tab.

The nonaqueous electrolyte secondary battery of the present invention therefore achieves a reduction of noise effects on hearing aids and the like by suppressing generation of magnetic fields resulting from an electrical current during use, and also improves reliability by reducing the risk of short circuit between the positive electrode tab and the negative electrode tab.

With the nonaqueous electrolyte secondary battery of the present invention, the positive electrode tab can be directly welded to the substrate portion, whereby the manufacturing process is simplified and a decrease of welding defect is expected. Furthermore, because the positive electrode tab and the negative electrode tab are arranged at the winding starting end, misalignment of the positive electrode tab that occurs because of winding variations during winding is reduced and the yield rate in manufacturing is improved.

Positive electrode substrates are generally made of aluminum or aluminum alloy. The positive electrode tab is therefore preferably made of aluminum or aluminum alloy, which reduces the electrical resistance between the positive electrode substrate exposed portion and the positive electrode tab.

The thickness of the positive electrode tab is preferably equal to or larger than the thickness of the positive electrode substrate so as to ensure mechanical strength. However, too much thickness lowers drop reliability. Thus, thickness equal to or smaller than 70 μm is preferable.

Laser welding is applicable for the welding between the positive electrode substrate exposed portion and the positive electrode tab and between the negative electrode substrate exposed portion and the negative electrode tab; however, applying resistance welding or ultrasonic welding instead can lower electrical resistance between the substrate exposed portions and the respective electrode tabs, and also can achieve lower manufacturing cost.

With the nonaqueous electrolyte secondary battery of the present invention, any one or a mixture of multiple kinds selected from lithium transition metal complex oxides represented by $LiMO_2$ (where M is at least any one of Co, Ni or Mn), such as $LiCoO_2$, $LiNiO_2$, $LiNi_xCo_{1-x}O_2$ (x=0.01 to 0.99), $LiMnO_2$, $LiMn_2O_4$, $LiNi_xMn_yCo_zO_2$ (x+y+z=1), and $LiFePO_4$, which are capable of reversibly absorbing and desorbing lithium ions, are applicable for a positive electrode active material used for a positive electrode plate. Replacing the transition metals with another element and adding another element as a single element or as a compound are also possible.

At least one selected from the group consisting of carbonaceous materials, silicon materials, and metallic oxides, which are capable of absorbing and desorbing lithium ions, is applicable for a negative electrode active material used for a negative electrode. A graphitized carbonaceous material is particularly preferable because of its high capacity.

Cyclic carbonic esters, linear carbonic esters, esters, cyclic ethers, linear ethers, nitriles, amides and the like are given for nonaqueous solvent applicable for the nonaqueous electrolyte of the nonaqueous electrolyte secondary battery of the present invention. Ethylenecarbonate, propylenecarbonate, butylenecarbonate, vinylenecarbonate and the like are given as a cyclic carbonic ester, and other compounds in which a part of or all of the hydrogen groups thereof are fluorinated, such as trifluoropropylenecarbonate and fluoroethylenecarbonate, are also applicable. A symmetric linear carbonic ester such as dimethylcarbonate and diethylcarbonate and an asymmetric linear carbonic ester such as ethylmethylcarbonate, methylpropylcarbonate, ethylpropylcarbonate and methylisopropylcarbonate are applicable as a linear carbonic ester. Other compounds in which a part or all of the hydrogens thereof are fluorinated are also applicable.

As an electrolyte consisting of an organic electrolytic solvent, provided are lithium salts such as lithium perchlorate ($LiClO_4$), lithium hexafluorophosphate ($LiPF_6$), lithium boronfluoride ($LiBF_4$), lithium hexafluoroarsenate ($LiAsF_6$), lithium trifluoromethylsulfonate ($LiCF_3SO_3$) and lithium bis(trifluoromethylsulfonyl)imide $[LiN(CF_3SO_2)_2]$. Using $LiPF_6$ and $LiBF_4$ is particularly preferable, in which the solution amount thereof for the organic solvent is preferably 0.5 to 2.0 mol/l. A nonaqueous electrolyte in the form of gel other than in the form of solution is also applicable in the present invention.

BEST MODE(S) FOR CARRYING OUT THE INVENTION

Embodiments of the present invention will now be described with reference to the accompanying drawings. The embodiments below are given as illustrative examples only of a prismatic nonaqueous electrolyte secondary battery so as to substantiate the technical thoughts of the present invention, and are not intended to limit the present invention to this prismatic nonaqueous electrolyte secondary battery. The present invention is thus equally applicable for various changes to be made without departing from the technical thoughts as set forth in the appended claims of the present invention. The respective drawings used for explanation in this description are given to show an overview structure schematically; therefore, the respective parts are not necessarily shown in proportion to the real size.

Specific structures of flattened wound electrode assemblies in examples and comparative examples and also a specific manufacturing method of nonaqueous electrolyte secondary batteries will now be described with reference to FIGS. 1 to 5. In a flattened wound electrode assembly 10A of Example 1 and flattened wound electrode assemblies 10B, 10C, and 10D shown in Example 2, Comparative Example 1, and Comparative Example 2, respectively, the differences in their structures result mainly from differences in an installing method of a positive electrode tab to a positive electrode plate and in an overlapping method of a positive electrode plate and a negative electrode plate before winding the flattened wound electrode assemblies. Like numerals will refer to like components.

Figure 1A:
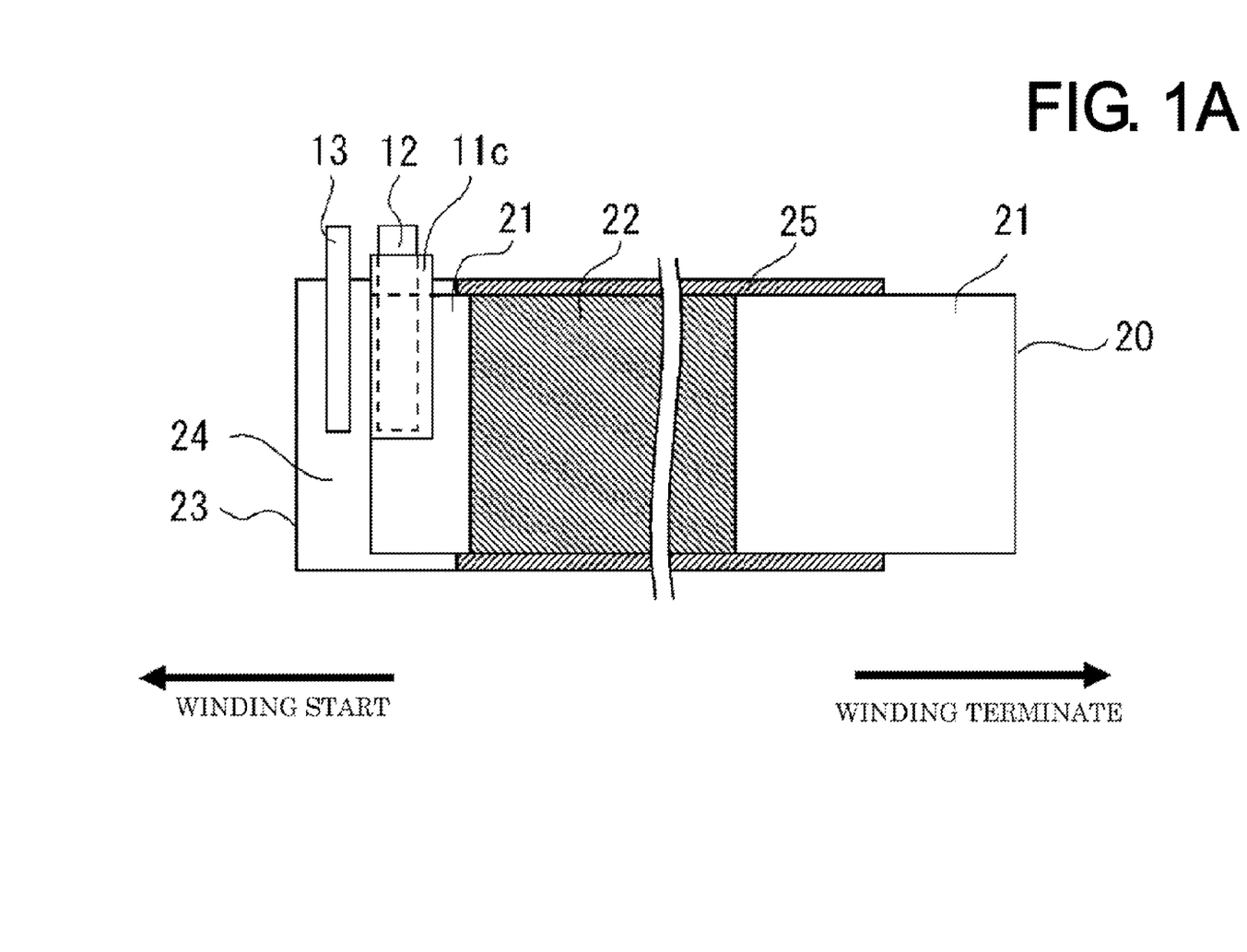
FIG. 1A is a schematic front view showing a condition before winding a wound electrode assembly according to Examples 1 and 2, and Comparative Example 2.
Figure 1B:
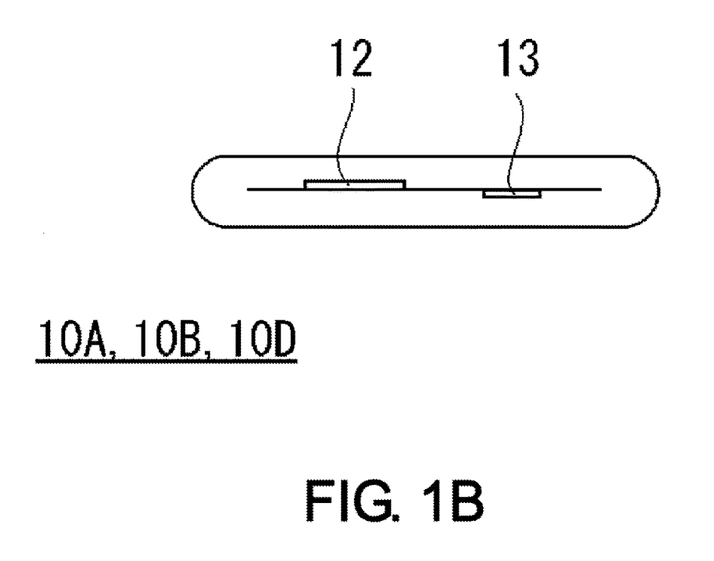
FIG. 1B is a schematic plan view of the wound electrode assembly viewed in the direction that a positive electrode tab and a negative electrode tab project.
Figure 2A:
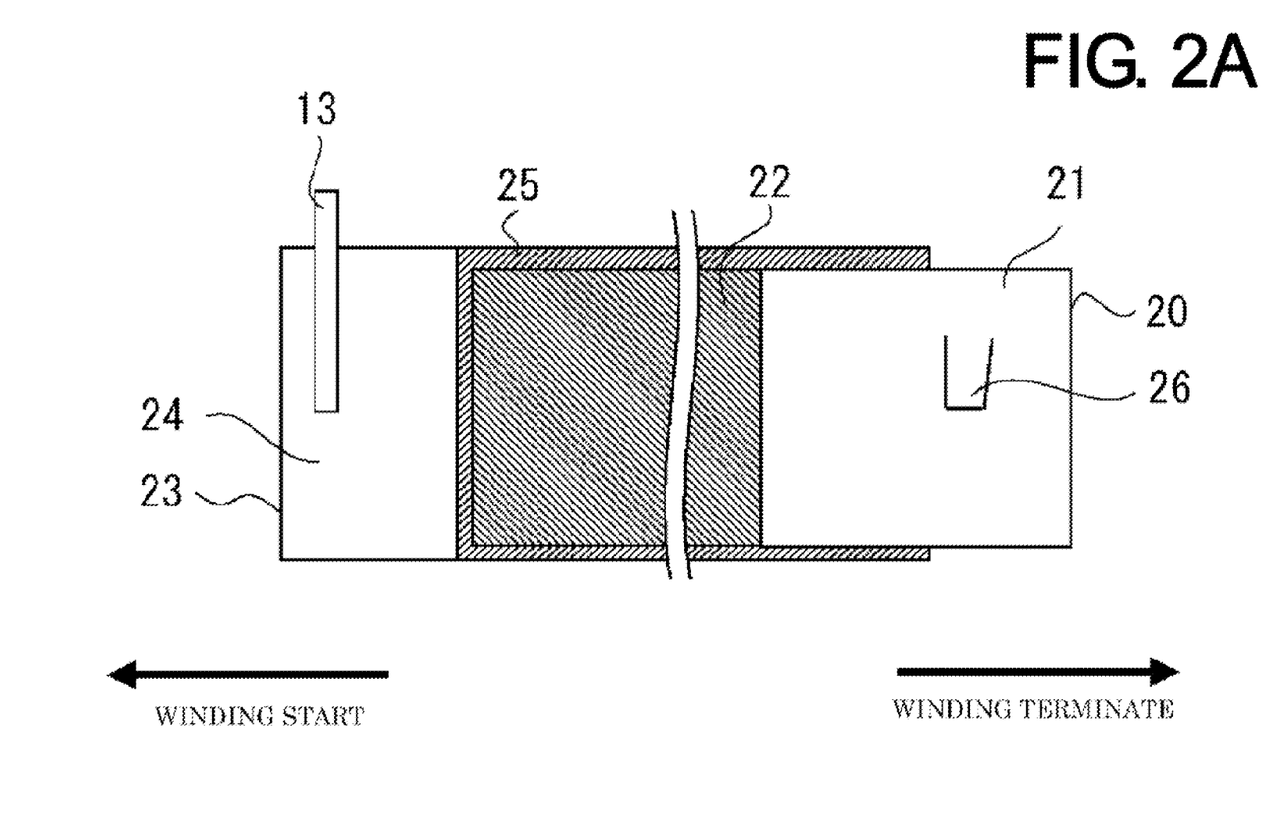
FIG. 2A is a schematic front view showing a condition before winding a wound electrode assembly according to Comparative Examples 1.
Figure 2B:
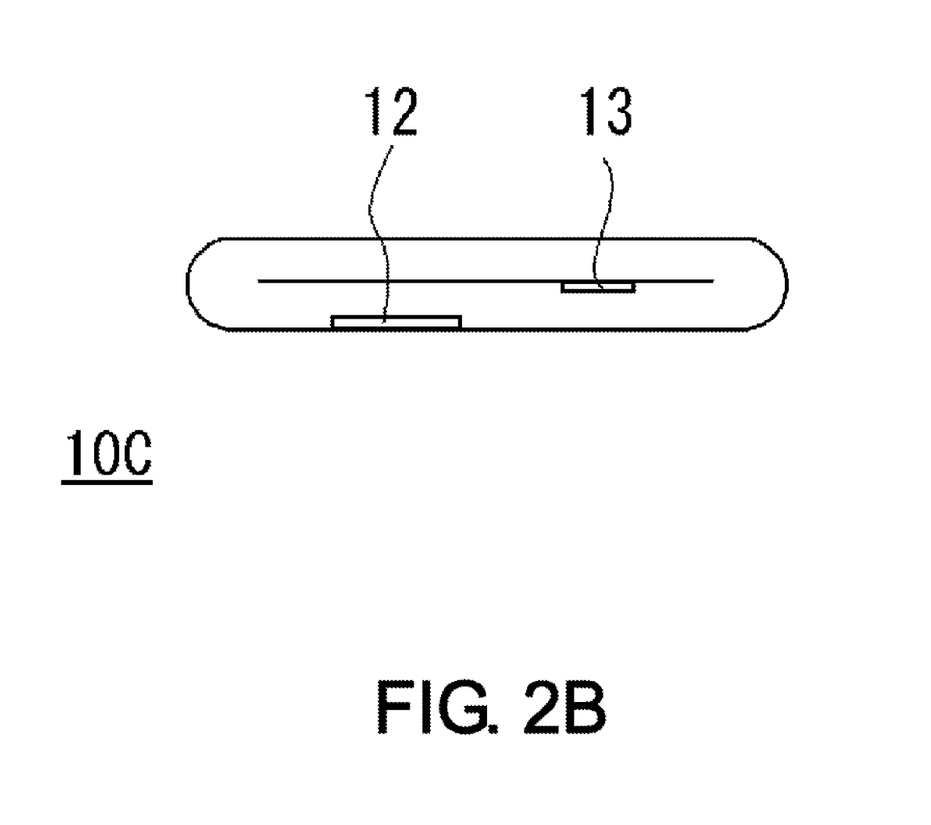
FIG. 2B is a schematic plan view of the wound electrode assembly viewed in the direction that a positive electrode tab and a negative electrode tab project.
Figure 3:
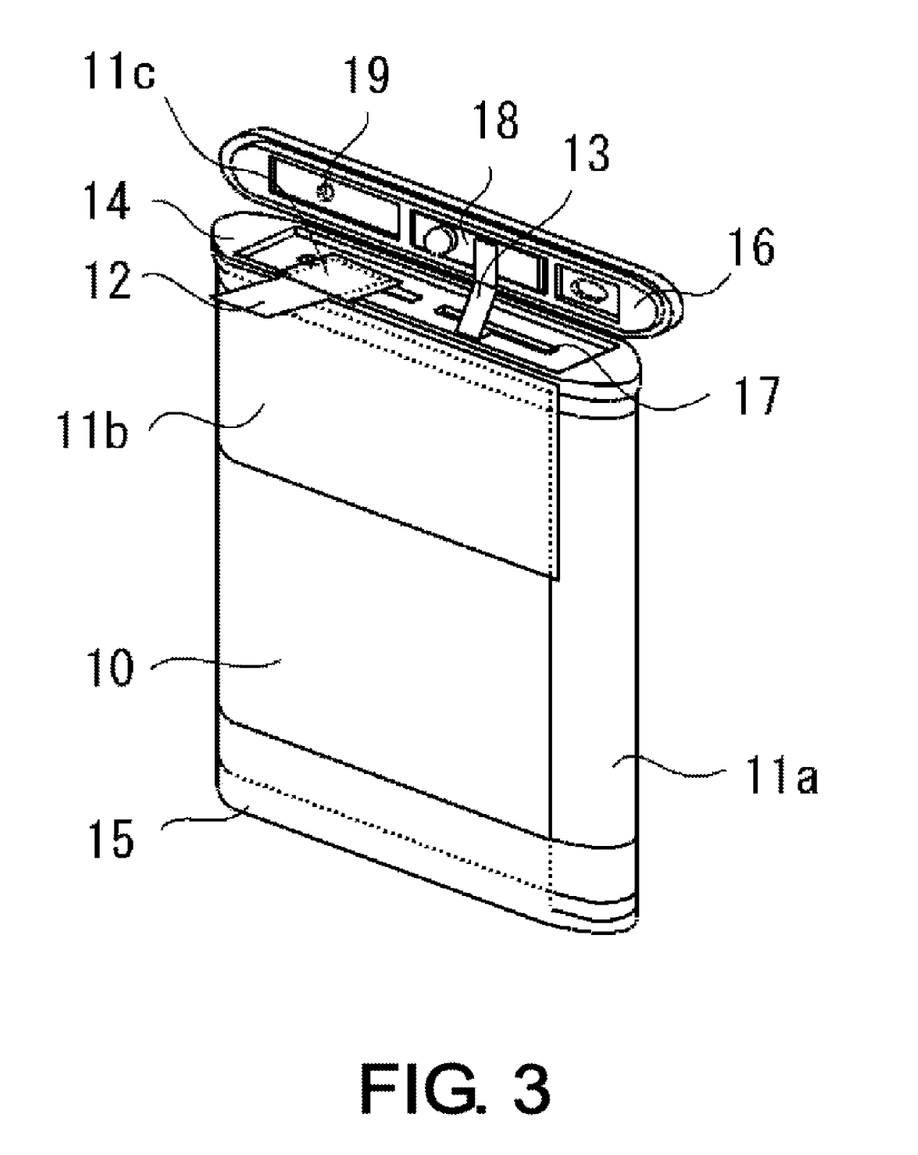
FIG. 3 is a perspective view showing a connecting condition of a flattened wound electrode assembly and a sealing plate according to Examples 1 and 2.
Figure 4:
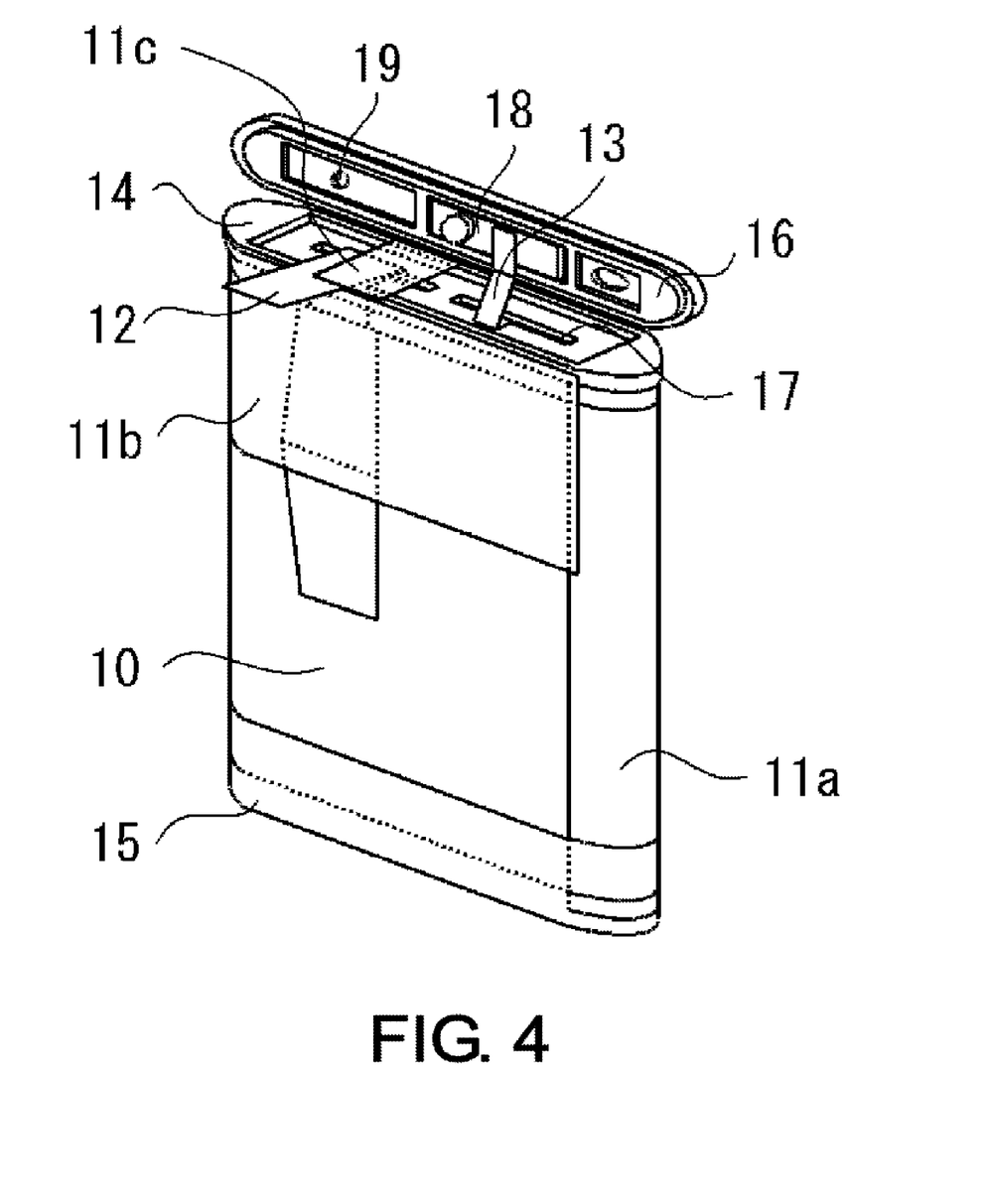
FIG. 4 is a perspective view showing a connecting condition of a flattened wound electrode assembly and a sealing plate according to Comparative Example 1.
Figure 5:
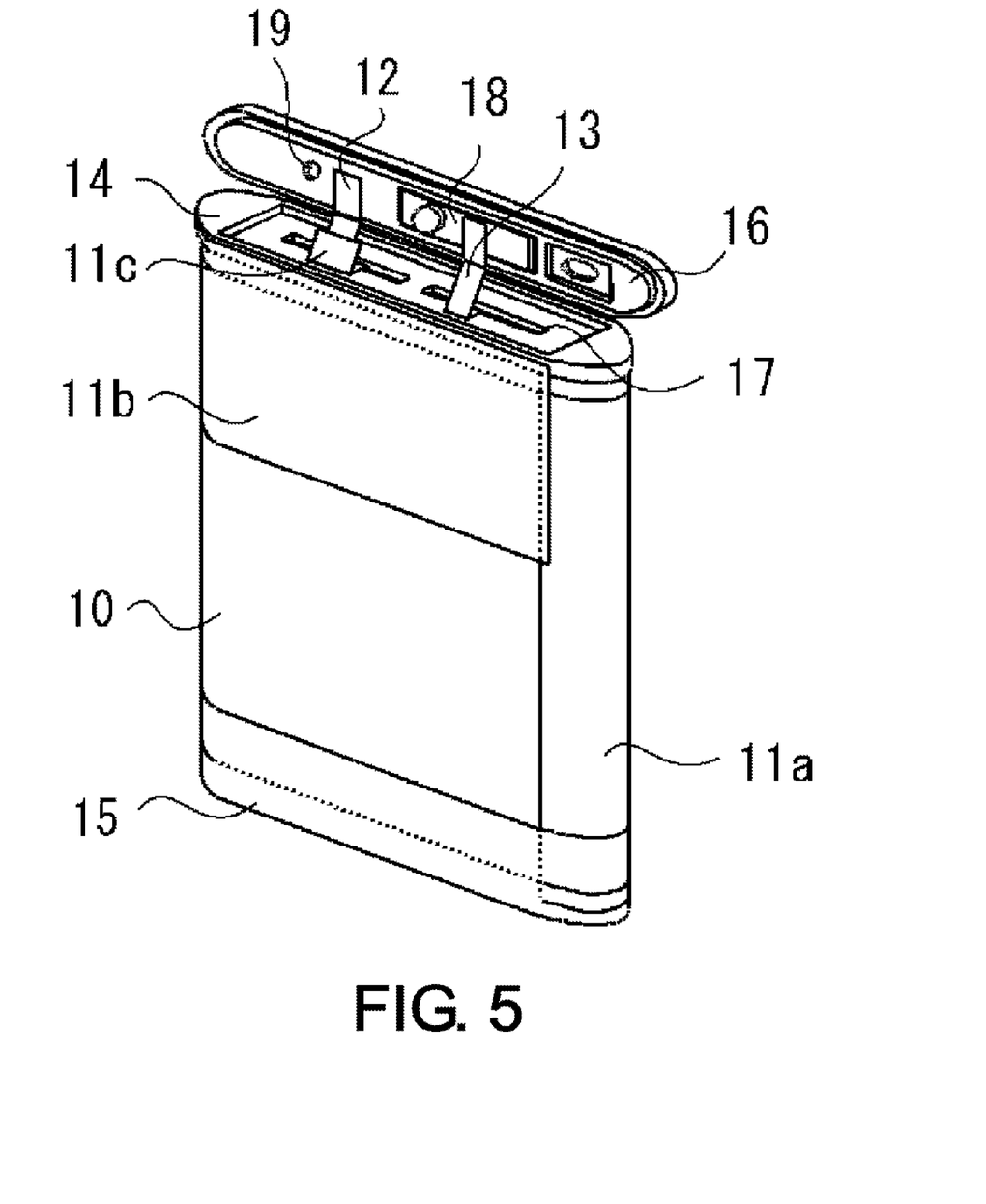
FIG. 5 is a perspective view showing a connecting condition of a flattened wound electrode assembly and a sealing plate according to Comparative Example 2.

FIG. 1A is a schematic front view showing a condition before winding the wound electrode assemblies 10A, 10B, and 10D according to Examples 1 and 2, and Comparative Example 2, in which a positive electrode plate 20 and a negative electrode plate 23 are overlapped with a separator (not shown) interposed therebetween. FIG. 1B is a schematic plan view of the wound electrode assemblies 10A, 10B, and 10D viewed in the direction that a positive electrode tab 12 and a negative electrode tab 13 project. FIG. 2A is a schematic front view showing a condition before winding the wound electrode assembly 10C of Comparative Example 1, in which a positive electrode plate 20 and a negative electrode plate 23 are overlapped with a separator (not shown) interposed therebetween. FIG. 2B is a schematic plan view of the wound electrode assembly 10C viewed in the direction that a positive electrode tab 12 and a negative electrode tab 13 project. FIG. 3 is a perspective view showing a connecting condition of the flattened wound electrode assembly 10A and a sealing plate 16 of Example 1. FIG. 4 is a perspective view showing a connecting condition of the flattened wound electrode assembly 10C and a sealing plate 16 of Comparative Example 1. FIG. 5 is a perspective view showing a connecting condition of the flattened wound electrode assembly 10D and a sealing plate 16 of Comparative Example 2. A separator is not shown in FIGS. 1A and 2A.

[Fabrication of Positive Electrode Plate]

The positive electrode plate of each of the examples and the comparative examples was made as follows. First, lithium cobalt oxide as a positive electrode active material, acetylene black as a carbonaceous conductive material, and PVDF (polyvinylidene difluoride) were mixed in a mass ratio of 95:2.5:2.5. Then, NMP (N-methylpyrrolidone) as a solvent was kneaded therein, and positive electrode mixture slurry was prepared. The slurry was applied to both surfaces of an aluminum positive electrode substrate having a thickness of 13 μm by the doctor-blade method and was dried so as to form a positive electrode active material layer on both surfaces of the positive electrode substrate. Thereafter, the positive electrode plate whose short sides were 43 mm long was made by being compressed with a compression roller.

[Installation of Positive Electrode Tab]

As shown in FIG. 1A, the positive electrode plate 20 of each of the wound electrode assemblies 10A, 10B, and 10D of Examples 1 and 2, and Comparative Example 2 was provided with a positive electrode substrate exposed portion 21 that had no positive electrode active material layers 22 on either surface of the positive electrode substrate for a certain distance from both ends in the long sides of the positive electrode plate 20. The aluminum positive electrode tab 12 was thereafter welded by ultrasonic welding to the winding starting end of the positive electrode substrate exposed portion 21. Then, an insulating tape 11c was attached for covering both surfaces of the positive electrode tab except the tip portion of the positive electrode tab.

As shown in FIG. 2A, the positive electrode plate 20 of the wound electrode assembly 10C of Comparative Example 1 was provided with a positive electrode substrate exposed portion 21 that had no positive electrode active material layers 22 only at the winding terminating end of the positive electrode plate 20, and then, the positive electrode tab 12 was welded to a slit portion 26 formed by making a U-shaped slit on the positive electrode substrate exposed portion 21. At this time, as described later, the winding of the electrode assembly was carried out after the slit portion 26 had been formed, and after the winding, the positive electrode tab was welded to the slit portion 26.

In the wound electrode assembles 10A, 10B, and 10C of Examples 1 and 2, and Comparative Example 1, the size of an aluminum piece used for the respective positive electrode tabs 12 was 0.03 mm in thickness, 6 mm in width, and 25 mm in length, whereas it was 0.1 mm in thickness, 3 mm in width, and 25 mm in length in the wound electrode assembly 10D of Comparative Example 2.

[Fabrication of Negative Electrode Plate]

The negative electrode plate common to Examples 1 and 2 and Comparative Examples 1 and 2 was made as below. First, synthetic graphite, a solution in which carboxymethylcellulose (CMC) is dissolved in pure water at 1% by mass, and styrene-butadiene rubber (SBR) were kneaded in a mass ratio of 98:1:1 with solid content rate to prepare negative electrode mixture slurry. Next, it was applied to both surfaces of the copper negative electrode substrate having a thickness of 8 μm by the doctor-blade method. Then, the copper negative electrode substrate was dried, and a negative electrode active material layer 25 was formed on both surfaces of the negative electrode substrate. Thereafter, the negative electrode plate 23 whose short sides were 44 mm long was made by being compressed with a compression roller.

[Installation of Negative Electrode Tab]

As shown in Figs. 1A and 2A, each negative electrode plate 23 was provided with a negative electrode substrate exposed portion 24 that had no negative electrode active material layers 25 on either surface of the negative electrode substrate for a certain distance from the winding starting end of the negative electrode substrate. The negative electrode tab 13 made of nickel was thereafter welded by ultrasonic welding to the negative electrode substrate exposed portion 24. The nickel piece used as the negative electrode tab 13 was in the size of 0.1 mm in thickness, 3 mm in width, and 25 mm in length.

[Preparation of Nonaqueous Electrolyte]

A nonaqueous electrolyte was prepared by dissolving $LiPF_6$ as a solute at a concentration of 1 mol/l in nonaqueous solvent in which ethylenecarbonate, ethylmethylcarbonate, and diethylcarbonate were mixed in a volume mixing ratio of 40:30:30.

[Fabrication of Flattened Wound Electrode Assembly]

In Examples 1 and 2 and Comparative Example 2, the flattened wound electrode assembly 10A of Example 1, the flattened wound electrode assembly 10B of Example 2, and the flattened wound electrode assembly 10D of Comparative Example 2 were each developed: by arranging, as shown in FIG. 1A, the positive electrode plate 20 and the negative electrode plate 23, which were made as above, so that the winding each could start from the end in which the positive electrode tab 12 and the negative electrode tab 13 had been welded; placing the positive electrode tab 12 between the negative electrode tab 13 and the negative electrode active material layer 25 and further placing the negative electrode tab 13 at a position without overlapping with the positive electrode substrate exposed portion 21 in order to reduce irregularities in the positions where the positive electrode tab 12 and the negative electrode tab 13 were placed: overlapping the positive electrode plate 20 and the negative electrode plate 23 with a separator made of microporous polyethylene film interposed therebetween; winding up the positive electrode plate 20 and the negative electrode plate 23 in a condition of being insulated from each other: fixing the winding terminating end with an insulating tape 11a (see FIGS. 3 and 4); and by pressing the resulting assembly. The distance L between the positive electrode tab 12 and the negative electrode tab 13 in the width direction of the battery was set as L=4 mm in Example 1 and Comparative Example 2, whereas it was set as L=12 mm in Example 2.

In Comparative Example 1, the flattened wound electrode assembly 10B was developed, as shown in FIG. 2A, by arranging the positive electrode plate 20 and the negative electrode plate 23 so that the negative electrode substrate exposed portion 24 would be placed in the winding starting end and the positive electrode substrate exposed portion 21 would be placed in the winding terminating end, overlapping the positive electrode plate 20 and the negative electrode plate 23 with a separator made of microporous polyethylene film interposed therebetween and winding them, fixing the winding terminating end with an insulating tape 11a, pressing the resulting assembly into a flattened shape, thereafter, welding the positive electrode tab 12 in a manner of having the slit portion 26 folded back at a right angle, and further folding back the slit portion 26.

When each of the flattened wound electrode assemblies 10A, 10B, and 10D of Examples 1 and 2 and Comparative Example 2 is viewed from the angle in which the positive electrode tab 12 and the negative electrode tab 13 project, the relative position between the positive electrode tab 12 and the negative electrode tab 13 is as shown in FIG. 1B. In the same way, the flattened wound electrode assembly 10C of Comparative Example 1 is viewed as shown in FIG. 2B.

[Fabrication of Nonaqueous Electrolyte Secondary Battery]

Each of the nonaqueous electrolyte secondary batteries of the examples and comparative examples was developed by installing insulating spacers 14 and 15 and the insulating tape 11b to the respective flattened wound electrode assemblies 10A through 10D that had been made as above described, bending the positive electrode tab 12 and the negative electrode tab 13 each into a predetermined form, inserting the flattened wound electrode assemblies 10A through 10D into a metallic-prismatic battery outer housing (not shown) in which an end surface in the longitudinal direction is open and the periphery surfaces are closed, sealing the mouth portion of the battery outer housing with the sealing plate 16, and sealing an electrolyte pour hole 19 after pouring a determined amount of nonaqueous electrolyte through the electrolyte pour hole 19. The difference in connecting conditions between the flattened wound electrode assemblies 10A through 10D and the respective sealing plates 16 will now be described, and also the difference in a sealing method of the battery outer housings and the respective sealing plates 16 will be described.

In Examples 1 and 2 and Comparative Example 1, the tip of the negative electrode tab 13 had been welded to a negative electrode terminal 18 by laser welding before sealing the mouth portion of the battery outer housing with the sealing plate 16. In Examples 1 and 2, the positive electrode tab 12 in which the insulating tape 11c had been attached to both surfaces thereof was formed by bending. In Comparative Example 1, the upper surface of the base of the bending portion of the positive electrode tab 12 was covered with the insulating tape 11c after forming the positive electrode tab, and further, the positive electrode tab 12 was interposed between the mouth portion of the battery outer housing and the sealing plate 16 when sealing the mouth portion of the battery outer housing with the sealing plate 16, and the clearance between the mouth marginal edge of the battery outer housing and the sealing plate 16 was sealed up by laser welding with the positive electrode tab 12 held between the mouth marginal edge of the battery outer housing and the sealing plate 16. The connecting conditions of the respective flattened wound electrode assemblies 10A and 10B to the sealing plates 16 in Examples 1 and 2 are schematically shown in FIG. 3. The connecting condition of the flattened wound electrode assembly 10C to the sealing plate 16 in Comparative Example 1 is schematically shown in FIG. 4.

In Comparative Example 2, as shown in FIG. 5, the tip of the negative electrode tab 13 was welded to the negative electrode terminal 18 by laser welding, the positive electrode tab 12 in which the insulating tape 11c had been attached to both surfaces thereof was formed by bending, and the tip of the positive electrode tab 12 was welded to the back surface of the sealing plate 16 by laser welding. Then, the mouth portion of the battery outer housing was sealed with the sealing plate 16, and thereafter, the clearance between the mouth marginal edge of the battery outer housing and the sealing plate 16 was sealed up by laser welding.

The size shared by the thus fabricated nonaqueous electrolyte secondary batteries of the respective examples and comparative examples is 5.2 mm in thickness, 34 mm in width, and 50 mm in height. The designed capacity is 1150 mAh.

[Measurement of Magnetic Field Generated by Discharge]

The nonaqueous electrolyte secondary batteries fabricated as above in Examples 1 and 2 and Comparative Example 1 were measured for the magnetic fields generated by discharge as follows. First, they had been charged until the battery voltage reached 4.2 V under a constant current of 1 It=1150 mA. After the battery voltage reached 4.2 V, they had been charged until the charging current reached 23 mA under a constant voltage of 4.2 V so as to achieve a full charge condition. Next, the battery conditions were adjusted by discharging under a constant current of 1 It=1150 mA.

The batteries in adjusted condition were charged under the same condition as described above, and one end of each of the lead wires was connected to the corresponding battery surface side of the negative electrode terminal 18 and to the sealing plate 16 (positive electrode). At this time. the lead wires were twisted with each other to remove the effect of magnetic fields due to the electrical currents traveling through the lead wires. The other end of each of the lead wires was connected to an output terminal of a power supply, and the magnetic field in the periphery of the battery was measured while providing a discharge load in a pulse waveform of a GSM spec to the battery using the power supply. The pulse waveform pattern of the GSM spec has a frequency of 217 Hz: the electrical current of 2 A corresponds to 0.6 ms, and the electrical current of 0.1 A corresponds to 1.4 ms.

As a measuring method of magnetic fields, in the nonaqueous electrolyte secondary battery in each of the examples and comparative examples, the magnetic field strength was measured by laying the battery in a manner that its side surfaces with the largest area would face in the vertical direction and by moving a magnetic field measuring coil on a flat surface located 1 cm above from the side surface of the battery. The measurement was carried out at 266 measuring points (19×14), in which the range of 18 cm×13 cm centering the battery was separated in every 1 cm in the directions of the length and the width. Next, based on the measured magnetic field strength, the size of the magnetic field was measured at the eight points shown in FIG. 6. The results are shown in Table 1.

Figure 6:
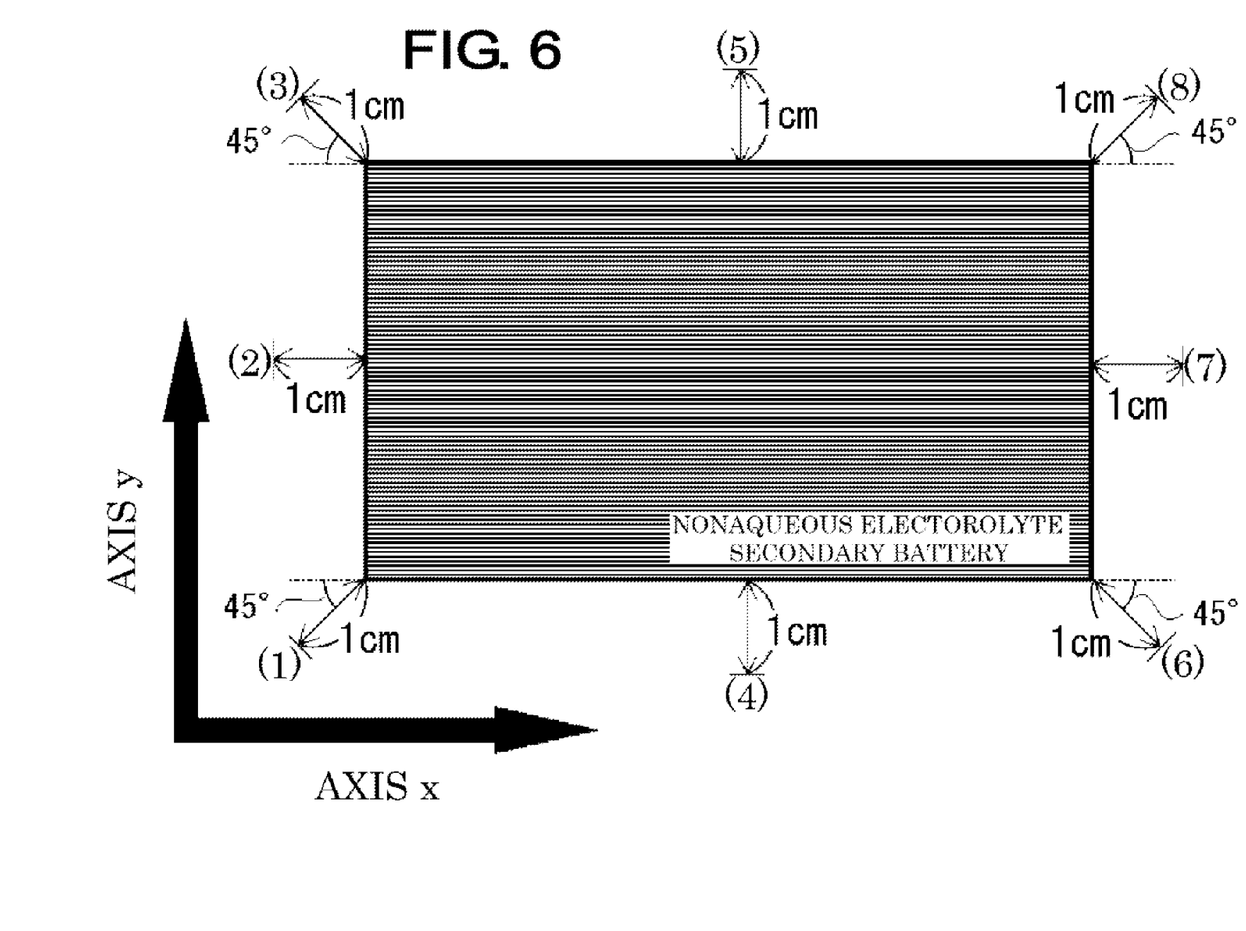
FIG. 6 is a schematic plan view, common through the examples and the comparative examples, showing measuring points of a magnetic field.

FIG. 6 is a schematic plan view showing a planar view of the condition in which the battery is laid with its side surfaces with the largest area facing in the vertical direction, and at this time, the end provided with the sealing plate 16 is arranged in the left side. The height direction of the battery is represented by the axis x, the width direction is represented by the axis y, and the thickness direction is represented by the axis z (not shown).

Table 1 shows the magnetic field strength at the eight points, which are located on a flat surface being 1 cm apart from the battery surface in the axis z direction. shown in FIG. 6 as a magnetic field size (the unit is dB (A/m) in the directions of x, y, and z. The magnetic field strength in the axis x direction of Comparative Example 1 at the position of the circled number 2 was determined as a standard (0 dB (A/m)) for conversion to dB (A/m).

TABLE 1

| Measuring point | Example 1 | | | Example 2 | | | Comparative Example 1 | | |
| --- | --- | --- | --- | --- | --- | --- | --- | --- | --- |
| | X | Y | Z | X | Y | Z | X | Y | Z |
| (1) | −35 | −20 | −2.0 | −20 | −5 | −15 | −15 | 0 | 0 |
| (2) | −20 | −20 | −15 | 0 | −15 | −5 | 0 | −5 | −5 |
| (3) | −20 | −20 | −20 | −15 | −5 | −15 | −15 | 0 | 0 |
| (4) | −15 | −20 | −30 | −10 | −10 | −25 | −5 | −15 | −20 |
| (5) | −15 | −20 | −20 | −10 | −10 | −25 | −5 | −15 | −20 |
| (6) | −35 | −20 | −20 | −25 | −20 | −20 | −20 | −15 | −10 |
| (7) | −20 | −30 | −15 | −20 | −25 | −25 | −10 | −20 | −5 |
| (8) | −35 | −20 | −20 | −25 | −20 | −20 | −20 | −15 | −10 |
| Ave. | −24.4 | −21.3 | −20.0 | −15.6 | −13.8 | −18.8 | −11.3 | −10.6 | −8.8 |
| Min. | −35 | −30 | −30 | −25 | −25 | −25 | −20 | −20 | −20 |
| Max. | −15 | −20 | −15 | 0 | −5 | −5 | 0 | 0 | 0 |

[Drop Reliability Test]

A drop reliability test was carried out as follows. Five nonaqueous electrolyte secondary batteries each in Examples 1 and 2 and Comparative Example 2 were prepared. Then, a harsh drop test was carried out, that is, to drop each of the batteries a thousand times in random directions from a height of one meter onto an iron plate, and thereafter the number of batteries that had had an internal resistance of 100 mΩ or more was counted. The internal resistance was measured every 50 drops. Once the internal resistance was measured to be 100 mΩ or more, the test was ended, and the number of drops when the internal resistance had reached 100 ml or more was recorded. The results are shown in Table 2.

TABLE 2

| | Number of drops when internal resistance reached 100 mΩ or more | | | | | Number of batteries in which internal resistance reached 100 mΩ or more |
| --- | --- | --- | --- | --- | --- | --- |
| | 1 | 2 | 3 | 4 | 5 | |
| Example 1 | — | — | — | — | — | 0 |
| Comparative Example 1 | 500 | 700 | 750 | 800 | — | 4 |
| Comparative Example 2 | 300 | 400 | 400 | 450 | 450 | 5 |

The results in Table 1 show that in Examples 1 and 2, the magnetic field is further reduced around the entire circumference of the battery than in Comparative Example 1, which means that the size of the magnetic field generated by discharge is further suppressed in Examples 1 and 2 than Comparative Example 1. The cause of such a phenomenon is conceived as follows.

In the positive electrode plate 20 and the negative electrode plate 23 of Examples 1 and 2, the positive electrode tab 12 and the negative electrode tab 13 are both arranged at the winding starting end of the wound electrode assembly. The electrical current of the positive electrode plate 20 and the electrical current of the negative electrode plate 23 therefore travel reversely to each other. Because the magnetic fields generated by the respective electrical currents balance each other out, the magnetic field leaking outside is suppressed.

Conversely, in Comparative Example 1, the positive electrode tab 12 is arranged at the winding terminating end and the negative electrode tab 13 is arranged at the winding starting end. Thus, the magnetic field generated by the electrical current traveling through the positive electrode plate 20 and the magnetic field generated by the electrical current traveling through the negative electrode plate 23 do not balance each other out but add to each other, which makes the magnetic field leak outside.

A magnetic field strength of more than −10 dB (A/m) is found at the measuring points of the circled numbers 1, 2, and 3 in Example 2, whereas the magnetic field strength is less than −10 dB (A/m) at every point in Example 1. It is presumed that the difference in the magnetic field strength at the points of the circled numbers 1, 2, and 3 may be caused mainly by the difference of the electrical currents traveling through the tabs. This indicates that the shorter distance between the positive electrode tab 12 and the negative electrode tab 13 provides a larger advantageous effect in reducing magnetic fields.

However, if the distance between the positive electrode tab 12 and the negative electrode tab 13 is too short, the risks are increased that the tabs will be deformed due to, for example, a drop impact and that the positive electrode tab and the negative electrode collector members come into contact with one another and a short circuit occurs. The distance between the positive electrode tab 12 and the negative electrode tab 13 is therefore preferably 2 mm or more.

In Example 2, in which the distance between the positive electrode tab 12 and the negative electrode tab 13 is 12 mm, the advantageous effect in reducing magnetic fields is also provided. However, based on the magnetic field calculation results of a simulation carried out separately, the distance between the positive electrode tab 12 and the negative electrode tab 13 is, further preferably, 10 mm or less, which makes the magnetic field strength at the measuring points less than −10 dB (A/m) in each of the directions of x, y, and z.

The results in Table 2 show the following. By carrying out the harsh drop test of a thousand times, the internal resistance reached 100 mΩ or more within a thousand times in four batteries of Comparative Example 1 and in all the five batteries of Comparative Example 2, whereas Example 1 had no batteries in which the internal resistance reached 100 mΩ or more.

As for the four batteries of Comparative Example 1 in which the internal resistance rose, the number of drops when the internal resistance reached 100 mΩ or more was 500 to 800. In Comparative Example 2, the internal resistance of all the five batteries reached 100 mΩ or more at 300 to 500 drops, which shows that the internal resistance rose earlier.

The batteries after the drop test were overhauled and the inner conditions were visually observed. In Comparative Example 2, the positive electrode tabs 12 of the batteries in which the internal resistance reached 100 mΩ or more were partially or completely fractured. In Comparative Example 1, the positive electrode tabs 12 of all the batteries were completely fractured. In Example 1, on the contrary, none of the positive electrode tabs 12 of the batteries was fractured.

It is thus obvious that Example 1 has enough drop reliability, and that in a comparison of Comparative Example 1 and Comparative Example 2, Comparative Example 1 has higher drop reliability.

The reason effecting the above drop reliability is assumed as follows. The positive electrode tab 12 of Comparative Example 2 is 0.1 mm in thickness, whereas Comparative Example 1 has thinner one, in which the thickness is 0.03 mm. In Comparative Example 1, therefore, the positive electrode tab 12 absorbs a drop impact by itself by gently bending when the impact is transmitted to the positive electrode tab 12. Furthermore, in Comparative Example 1, the positive electrode tab 12 is interposed between the outer housing and the sealing plate 16. That reduces the impact itself that is transmitted to the positive electrode tab 12 compared to Comparative Example 2, in which the tip of the positive electrode tab 12 is welded to the back surface of the sealing plate 16. As a result, in Comparative Example 1, drop reliability is further improved than in Comparative Example 2.

Accordingly, in order to improve drop reliability of batteries, it is preferable that the positive electrode tab 12 gently bends. In addition, according to another examination results, the thickness of the positive electrode tab 12 is preferably 70 μm or less.

In Example 1, both surfaces in the base of the bending portion of the positive electrode tab 12 is covered with an insulating tape, and the positive electrode tab 12 is arranged at the winding starting end. Compared to Comparative Example 1, therefore, the length of the bending portion is shorter, and a load applied to the bending portion in a drop impact is smaller. It is thus presumed that the drop reliability may be synergistically improved.

EXPLANATIONS OF LETTERS OR NUMERALS 10A to 10D flattened wound electrode assembly
11a to 11c insulating tape
12 positive electrode tab
13 negative electrode tab
14, 15 insulating spacer
16 sealing plate
17 slit
18 negative electrode terminal
19 electrolyte pour hole
20 positive electrode plate
21 positive electrode substrate exposed portion
22 positive electrode active material layer
23 negative electrode plate
24 negative electrode substrate exposed portion
25 negative electrode active material layer

The invention claimed is:

1. A nonaqueous electrolyte secondary battery comprising:
a flattened wound electrode assembly including a positive electrode plate that has a positive electrode active material layer and a positive electrode substrate exposed portion and including a negative electrode plate having a negative electrode active material layer and a negative electrode substrate exposed portion, the positive electrode plate and the negative electrode plate being wound with a separator interposed therebetween;
a flattened metallic outer housing having a mouth portion at an end and accommodating the wound electrode assembly;
a sealing plate mating with the mouth portion of the metallic outer housing;
a positive electrode tab electrically connected to the positive electrode substrate exposed portion; and
a negative electrode tab electrically connected to the negative electrode substrate exposed portion,
the positive electrode substrate exposed portion to which the positive electrode tab is electrically connected and the negative electrode substrate exposed portion to which the negative electrode tab is electrically connected being both arranged at the winding starting end of the wound electrode assembly,
the positive electrode tab being welded to the outer housing and the sealing plate in a manner of being held between the mating portions of the outer housing and the sealing plate,
the negative electrode tab being electrically connected to a negative electrode terminal provided to the sealing plate, and
the positive electrode tab and the negative electrode tab being arranged apart from each other with a distance of 2 mm or more to 12 mm or less in the width direction of the battery.

2. The nonaqueous electrolyte secondary battery according to claim 1, wherein the positive electrode tab is made of aluminum or aluminum alloy and the thickness of the positive electrode tab is equal to or larger than the thickness of the positive electrode substrate and equal to or smaller than 70 μm.

3. The nanoqueous electrolyte secondary battery according to claim 1, wherein both surfaces of the positive electrode tab are covered with an insulating tape.

4. The nanoqueous electrolyte secondary battery according to claim 2, wherein both surfaces of the positive electrode tab are covered with an insulating tape.

5. The nonaqueous electrolyte secondary battery according to claim 1, wherein the positive electrode tab has a bending portion between the sealing body and an end surface of the flattened wound electrode assembly at a mouth portion side, and both surfaces of the bending portion are covered with an insulating tape.

6. The nonaqueous electrolyte secondary battery according to claim 2, wherein the positive electrode tab has a bending portion between the sealing body and an end surface of the flattened wound electrode assembly at a mouth portion side, and both surfaces of the bending portion are covered with an insulating tape.

* * * * *